United States Patent Office 2,934,528
Patented Apr. 26, 1960

2,934,528

WATER-SOLUBLE POLYMERS OF N,N'-ETHYL-ENE-BIS-ACRYLAMIDE

Lennart Albert Lundberg, Stamford, Conn., assignor to American Cyanamid Company, New York, N.Y., a corporation of Maine No Drawing. Application November 21, 1956
Serial No. 623,555

16 Claims. (Cl. 260—88.3)

This invention relates to a method of making high molecular weight polymers and to the product produced thereby. More particularly, the present invention relates to high molecular weight water-soluble, cationic polymers which are obtained by reacting an alkylidene acrylamido compound (I) containing at least two acrylamido, i.e.

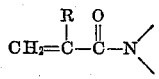

groups, wherein R is selected from the group consisting of hydrogen, and a lower alkyl radical with a nitrogen compound (II) containing at least three hydrogen atoms linked to the nitrogen atoms thereof.

Polymers of the present invention are obtained as a result of addition of the primary amine groups to the unsaturated groups of the acrylamido compound and, the resulting addition product reacts further through the secondary amine groups with residual unsaturated groups resulting in branching and eventually cross-linking of chains, unless the reaction is terminated, to give water-insoluble resins.

According to the present invention, I have found that a high molecular weight stable water-soluble polymer may be obtained by reacting compounds of this type. Two techniques may be employed to obtain the water-soluble polymer of the invention. The water-soluble stable polymer may be obtained by reacting the compounds of the type of (I) and (II) in nearly equimolar quantities until the reaction proceeds to a point just short of the gel stage and stabilizing the polymer by the addition of a secondary amine to terminate the reaction. By this technique I have found that the secondary amine which is added just before irreversible gelation occurs, reacts preferentially with the residual vinyl groupings remaining in the mixture and inhibits cross-linking of the reaction product to the water-insoluble stage.

As an alternate procedure, a stable water-soluble material may be obtained by using a low enough ratio of the alkylidene acrylamido compound (I) to the nitrogen compound (II) so that although the reaction proceeds to completion the polymer remains soluble. In following this latter procedure, some sacrifice may result in molecular weight and degree of branching due to deficiency of one of the reacting groups responsible for chain growth.

The products obtained in the present invention have no residual vinyl groups in the polymer, i.e. there is no carbon to carbon unsaturation in the polymers produced.

It is an object of the present invention to prepare high molecular weight water-soluble cationic polymers of an (I) acrylamido compound and (II) a nitrogen-containing compound wherein at least three hydrogen atoms are linked to the nitrogen atoms.

It is a further object of the present invention to provide a novel process for making stable high molecular weight water-soluble polymers by reacting compounds of the type (I) and (II) as hereinafter more fully described.

According to the invention, the high molecular weight water-soluble polymers contemplated are those obtained by reacting in an aqueous medium (I) a compound of the group (a) having the formula

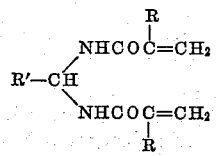

and (b) having the formula

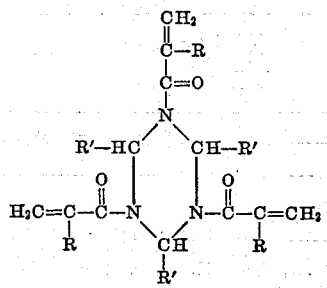

wherein R'—CH< is the hydrocarbon residue of an aldehyde and R is a member of the group consisting of hydrogen and alkyl radicals having 1 to 4 carbon atoms, with a compound (II) selected from the group of low molecular weight polyalkylene polyamines of the general formula

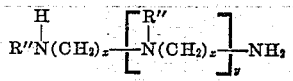

wherein R" is a substituent selected from the group consisting of hydrogen, an alkyl radical and an aryl radical, "x" is an integer of at least 2, and "y" is an integer having a value of from 0–8; aromatic diamines; and ammonia.

Suitable diacrylamido compounds within the scope of the invention, i.e. those having the formula

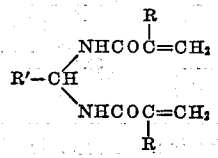

wherein R'—CH< and R are substituents as above defined, are known and may be prepared for example in the manner described in the L. A. Lundberg U.S. Patent 2,475,846.

In the compounds of this formula, the R'—CH< group may be derived as the hydrocarbon residue of formaldehyde, acetaldehyde, propionaldehyde, butyraldehyde, pentanal, capryl aldehyde, lauric aldehyde, crotonaldehyde, benzaldehyde, furfural, salicylaldehyde, cinnamic aldehyde, or the like. In other words, R' may be hydrogen, alkyl, alkenyl, aralkyl, aralkenyl, aryl or heterocyclic. Instead of formaldehyde itself, para-formaldehyde or a substance yielding formaldehyde such as hexamethylene-tetramine may be used to produce the alkylidene-bis-acrylamide resin intermediates.

The compounds of this type having the two acrylamido groups are such as for example N,N'-methylene-bis-acrylamide and N,N'-methylene-bis-methacrylamide.

The cyclic compounds containing three acrylamido or

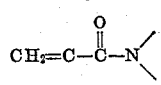

groups, i.e. compounds of the type as hexahydro-1,3,5-triacryl-s-triazines, may be prepared as described in the Zerner et al. U.S. Patent 2,559,835.

The nitrogen-containing compound (II) containing at least three hydrogen atoms linked to the nitrogen atoms are such as ammonia; various polyalkylene polyamines including ethylene diamine, diethylene triamine, triethylene tetramine, tetraethylenepentamine, pentamethylene hexamine, trimethylene diamine, ethylenebisoxypropylamine, iminobispropylamine, methyliminobispropylamine and the like; and including N aryl substituted alkylene polyamines such as N-phenylethylenediamine and N-phenylpropylenediamine. Aromatic diamines such as those having the formula

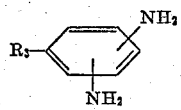

wherein $R^3$ is an alkyl containing 0 to 18 carbon atoms such as p-phenylene diamine and p-diamino, phenyl propane for example may also be used in whole or in part as the nitrogen-containing component (II) of the reaction mixture.

The invention will be described in greater detail in connection with the following specific examples in which the proportions given are parts by weight unless otherwise expressly stated.

In making the water-soluble polymer using the secondary amine to stabilize the resin, the chosen quantities of the acrylamido-containing compounds (I) and the nitrogen-containing compounds (II) are dissolved in water at approximately room temperature in a suitable reaction vessel and reacted. The reaction is continued until a point just short of the gel stage at which time the polymerization reaction product is stabilized by the addition of a secondary amine to the reaction mixture. The secondary amine terminates cross-linking of the polymer by reacting preferentially with the residual unreacted vinyl groups in the mixture. The results obtained by reacting various combinations of compounds of the type (I) and (II) in nearly equimolar amounts, the reacting conditions, and the results obtained including comparative examples are set forth in the following tables.

Table II shows the results obtained with further examples using N,N-methylene-bis-acrylamide as compound (I) and various other nitrogen-containing compounds, including ammonia as compound (II) and as the chain terminating secondary amine, dimethylamine.

TABLE I

| Example | N,N-Methylenebis-Acrylamide (Parts) | Nitrogen Compound and Parts | Water | Maximum Temperature | Time (Minutes) | Secondary Amine | Remarks |
|---|---|---|---|---|---|---|---|
| 1 | 30.8 | 1,3-diamino butane, 17.6 | 77.6 | Steam bath, 65° C. | 17 | None | Gelled. |
| 2 (Comparative) | 30.8 | do | 73 | 65° C. | 13 | Diethylamine, 7.3. | Clear water-white syrupy solution stable on heating with $(NH_4)_2S_2O_8$. |
| 3 | 30.8 | Ethylene diamine (69% aqueous solution), 17.4. | 63.8 | 70° C. | 6 | Diethylamine, 3.7. | Solution—viscous water-white. |
| 4 (Comparative) | 30.8 | Ethylene diamine (69%), 17.4. | 63.8 | 70° C. | About 3 min. | Diethylamine, 7.3. | Solution—thin, watery. Stable upon heating with $(NH_4)_2S_2O_8$. |
| 5 | 31.9 | Triethylenetetramine, 29.6. | 61.4 | 50° C.±1° | 7 | do | Viscous solution. Stable upon heating with $(NH_4)_2S_2O_8$. |
| 6 (Comparative) | 31.9 | do | 61.4 | 50° C.±1° | 8 | None | Gel within 10 minutes after cooling to room temperature. |

TABLE II

| Example | N,N'-Methylenebis-Acrylamide (Parts) | Amine and Parts | Water | Temperature | Time Before Stopping (Minutes) | Dimethylamine | Time | Remarks |
|---|---|---|---|---|---|---|---|---|
| 7 | 31.8 | Trimethylenediamine, 14.8. | 63.8 | 25° C., rose to 59° C. | 5 | 4.5 | | Slightly cloudy viscous solution. |
| Comparative Example | 31.8 | do | 63.8 | do | | 0.1 mole | 6.5 | Gelled. |
| 8 | 31.8 | Ethylenebisoxypropylamine, 35.2. | 63.8 | 25° C., rose to 52° C. | 13 | 4.8 | | Viscous solution. |
| Comparative Example | 31.8 | do | 63.8 | do | | | 15 | Viscous solution gelled when on steam bath 3½ minutes. |
| 9 | 31.8 | Iminobispropylamine, 26.2. | 63.8 | 25° C., rose to 68° C. | 2 | 4.8 | | Viscous solution. |
| Comparative Example | 31.8 | do | 63.8 | do | | | 3 | Gelled. |
| 10 | 31.8 | Methyliminobispropylamine, 29.0. | 63.8 | 25° C., rose to 54° C. | 9½ | 4.8 | | Viscous solution. |
| Comparative Example | 31.8 | do | 63.8 | do | | | 12½ | Very viscous—gelled when on steam bath 3½ minutes. |

Example 11

Following the procedured described above, 49.8 parts of hexahydro-1,3,5-triacryl-s-triazine and 29.6 parts of triethylene tetramine are added to 79.4 parts of water and held at a temperature of 50° C.±2° C. for 5 minutes. The reaction product becomes very viscous. At this stage, 7.3 parts of diethylamine are immediately added and the mixture is heated over steam bath for 30 minutes. A viscous resinous solution which may readily further be dissolved in water is obtained.

Example 12

[p-Phenylene diamine—$NH_2$—$C_6H_3$—$NH_2$.]

| | Parts | Moles |
|---|---|---|
| (1) p-phenylene diamine | 21.62 | 0.2 |
| (2) methylene-bis-acrylamide | 30.82 | 0.2 |
| (3) $H_2O$ | 78.60 | |
| (4) acetic acid, glacial | 12.0 | 0.2 |

The above ingredients are charged into the reaction vessel and heated by means of a steam bath. The solid reactant dissolves upon heating to 88° C., giving a lavendish black colored solution. The reaction product gels to a water-insoluble condition upon heating two hours.

The above reaction is repeated. After heating 1.5 hours at a temperature of 88–90° C., 5.84 parts (0.08 mole) of diethylamine is added. The viscous resinous syrup is heated 1½ hours longer without any noticeable change in viscosity. The viscous nearly black resinous syrup is completely miscible with water.

Illustrative of the secondary amines which may be employed to terminate the reaction between compounds of the type of (I) and (II) before the copolymerization of these compounds has advanced to the water-insoluble gel stage are such as dimethylamine, diethylamine, diethanolamine, N-methylethanolamine, cyclohexylmethylamine and aromatic secondary amines such as monomethyl aniline.

The proportions of the acrylamido compound (I) to the nitrogen-containing compound (II) may be varied. Generally the molar ratio of (I) to (II) is maintained within the rage of 0.4:1 to 3:1 respectively. It will be understood that when the acrylamido compound of type (I) is a cyclic trisacrylamido compound rather than the bisacrylamido compounds, the mole proportion of this compound to the amino-type compound (II) may be correspondingly diminished. Thus, when the bisacrylamido compounds are utilized, I have found that a mole ratio of (I) to (II) of about 0.6:1 to 3:1 may be employed, preferably 0.8:1 to 3:1, and when employing the trisacrylamido compounds a ratio of (I) to (II) in the range of 0.4:1 to 3:1 preferably 0.6:1 to 3:1 is employed.

When it is desired to conduct the reaction so as to avoid using a secondary amine and yet obtain a stable water-soluble product the mole ratio of compounds (I) to (II) should be less than about 0.85 in the case of the bisacrylamido compound and less than about 0.65 mole in the case of the trisacrylamido compound. In using these ratios the reactants may be carried to completion without cross-linking of the composition to a water-insoluble state occurring, as the mole ratios of acrylamido compound to polyamine when reacted to substantial completion are below the stage at which cross-linking takes place.

When a secondary amine is used to stabilize the copolymer in a water-soluble condition before the reaction has advanced to the water-insoluble gel stage, an amount at least sufficient to terminate further interreaction between the components (I) and (II) of the mixture should be employed. Although the amount of secondary amine used for this purpose is not critical, generally an amount equivalent to 2.5 to 3 times the difference between the molar amount of alkylidene acrylamido compound to polyamine and 0.80 is sufficient. For example where 1 mole alkylidene-bis-acrylamide per mole polyamine is reacted, the amount of secondary amine would be (1 less 0.8) times 2.5 or 0.5 mole of secondary amine. None of the products stabilized with diethylamine gelled upon heating with a catalytic amount of $(NH_4)_2S_2O_8$ indicating no residual vinyl groupings are present.

The temperature at which the reaction is carried out may be varied considerably, although it is preferably conducted at a temperature of from about 20° C. to about 90° C. At lower temperatures, polymerization proceeds slowly whereas high temperatures may be disadvantageous in that the polymerization may advance so rapidly at the point close to the gel stage as to prevent the timely addition of the secondary amine prior to the time the water-insoluble condition of the resin is reached.

The following examples, set forth in Tables III and IV, further illustrate the nature of the reaction and provide a suitable technique in determining the stage, prior to gelation, at which the secondary amine is added to produce a high molecular weight water-soluble product.

Table III shows the results of varying the mole ratios of compounds (I) to (II). In the lower ratio of acrylamido compound, i.e. N,N'-methylene-bis-acrylamide (MBA) to nitrogen compound, i.e tetraethylene tetramine (TETA) Examples 13–15, the reaction is carried to completion and the product remains water-soluble whereas in Example 16, the reaction proceeds to a water-insoluble stage unless the reaction is terminated short of the gel stage by the addition of a secondary amine, as in Example 17.

The procedure employed for Examples 13–17 is as follows: The TETA is added rapidly to a slurry of MBA in water. (50% solids.) The temperature rises rapidly to a maximum temperature of 65–75° C. In the preparation of Example 17, the reaction is allowed to continue until a noticeable viscosity change begins to take place. Soon after this stage (1–2 minutes) is reached, the diethylamine is added at a time as determined and described below. After 15 minutes, the resulting clear syrup is heated at a temperature of 90° C.–92° C. over a steam bath for 30 minutes.

TABLE III

| Example | MBA | | TETA | | Viscosity—Gardner-Holdt Bubble Vis. Tubes | Parts $H_2O$ | Chain Terminator |
| | moles | parts | moles | parts | | | |
|---|---|---|---|---|---|---|---|
| 13 | 0.6 | 37.0 | 1 | 58.4 | I (2.25 poise) | 95.4 | None. |
| 14 | 0.7 | 43.2 | 1 | 58.4 | N (3.4 poise) | 101.6 | None. |
| 15 | 0.8 | 49.3 | 1 | 58.4 | W (10.7 poise) | 107.7 | None. |
| 16 | 0.9 | 55.4 | 1 | 58.4 | X (12.9 poise) | 113.8 | None.[a] |
| 17 | 0.9 | 55.4 | 1 | 58.4 | X (12.9 poise) | 113.8 | 14.6 parts diethylamine +[b]. |

[a] Gelled within 12 minutes.
[b] Diethylamine added 9 minutes from start of reaction.

A procedure to determine the optimum time to add the secondary amine to terminate the reaction is as follows: The reaction is carried out at 25–30° C.; the viscosity is ascertained periodically to establish the best time to add the chain terminator. In the procedure employed in Examples 18–21, the results of which are set forth in Table IV, the triethylamine tetramine is added dropwise to a slurry of MBA and water while holding the temperature between 25 and 30° C. by external cooling. The addition required from 2–3 minutes.

TABLE IV
PREPARATIONS INVOLVING USE OF CHAIN TERMINATOR

| Example | MBA Mole | MBA Part | TETA Mole | TETA Part | H₂O, Part | Chain Terminator (DEA) Mole | Chain Terminator (DEA) Part | Percent Solids | Reaction Time Before Adding DEA, Min. at 25-30° C. | No Chain Terminator Added, Time to gel | Viscosity of Stabilized Product |
|---|---|---|---|---|---|---|---|---|---|---|---|
| 18 | 1 | 154.1 | 1 | 146 | 452.5 | 0.6 | 43.8 | 41.3 | 40 | 50 | K (2.75 poise). |
| 19 | 1.5 | 231 | 1 | 146 | 554.5 | 2.1 | 153.5 | 44.1 | 39 | 43-44 | U-V (6.2-8.8 poise). |
| 20 | 2.0 | 308.2 | 1 | 146 | 680.5 | 3.6 | 262.8 | 46.1 | 45 | 59 | B-C (0.65-0.85 poise). |
| 21 | 2.0 | 308.2 | 1 | 146 | 680.5 | 3.6 | 262.8 | 46.1 | 55 | 58 | J (2.5 poise). |

In order that the reaction does not progress too rapidly to afford opportunity for timely stopping the polymerization, the temperature is preferably not allowed to climb above 30° C. After 25–30 minutes, practically all of the solid has dissolved. A sample is taken up in a 25 ml. volumetric pipette, and the time to drain is measured using a stop watch (the pipette employed had the same size opening at the bottom as at the top to afford uniform flow). A check on the viscosity is made in this manner every 4–5 minutes. When the time for a sample to flow through the pipette increases from 5–7 seconds to about 30–35 seconds, the diethylamine is quickly added. A sample is removed prior to adding diethylamine and the time to gel noted (measured from the time the diethylamine is added to bulk of resin syrup).

Data recorded for Example 21 showing the increase in viscosity as determined by flow of samples through the pipette follows:

| Samples Drawn, Time | Time to Flow Through Pipette |
|---|---|
| 9:10 | Start of run. |
| 9:35 | 7.2 seconds. |
| 9:40 | 10.6 seconds. |
| 9:45 | 17.0 seconds. |
| 9:49 | 31.5 seconds. |
| 9:49.5 | Added diethylamine rapidly. |
| 10:10 | Heated 30 minutes over steam bath at reflux (78–82° C.). |

The water-soluble cationic polymers of this invention have certain advantage over those obtained by reacting a polyalkylene polyamine with an alkylene halide for some applications in that no mineral acid such as hydrochloric acid is liberated. The resulting products are obtained as the free base which is desirable particularly where the products are to be used as modifiers for cellulosic materials such as paper, textiles and the like.

Various modifications within the contemplation of the invention will be apparent to those skilled in the art, and the invention is not intended to be limited to the specific details enumerated except as expressed in the appended claims.

I claim:

1. A process of preparing a high molecular weight water-soluble copolymer comprising reacting in an aqueous medium a compound (I) selected from the group (a) having the formula

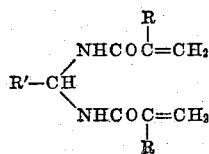

and (b) having the formula

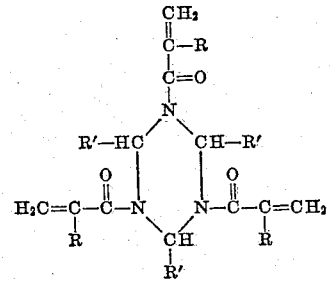

wherein R'—CH< is the hydrocarbon residue of an aldehyde and R is a member of the group consisting of hydrogen and alkyl radicals having 1 to 4 carbon atoms, and a compound (II) selected from the group of low molecular weight alkylene polyamines having the general formula

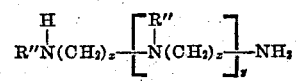

wherein R" is a substituent selected from the group consisting of hydrogen, an alkyl radical and an aryl radical, "x" is an integer of at least 2, and "y" is an integer having a value from 0–8, aromatic diamines and ammonia, in a mole ratio of (I) to (II) of 0.6:1 to 3:1, respectfully, at atmospheric pressure and at a temperature of from about 20° C. to about 90° C. to a point short of the gel stage and terminating further polymerization by the addition of sufficient amount of a mono secondary amine to react with the residual vinyl groups of said copolymer.

2. A process of preparing a high molecular weight water-soluble copolymer comprising reacting in an aqueous medium (I) N,N'-methylene-bis-acrylamide and a compound (II) selected from the group of low molecular weight alkylene polyamines having the general formula

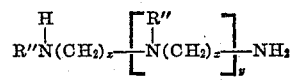

wherein R" is a substituent selected from the group consisting of hydrogen, an alkyl radical and an aryl radical, "x" is an integer of at least 2, and "y" is an integer having a value from 0–8, aromatic diamines, and ammonia, in a mole ratio of (I) to (II) of 0.8:1 to 3:1 respectively, at atmospheric pressure and at a temperature of from about 20° C. to about 90° C. to a point short of the gel stage and terminating further polymerization by the addition of sufficient amount of a mono secondary amine to react with the residual vinyl groups of said copolymer.

3. A process of preparing a high molecular weight water-soluble copolymer comprising reacting in an aqueous medium (I) hexahydro-1,3,5-triacrylyl-s-triazine and a compound (II) selected from the group of low molecular weight alkylene polyamines having the general formula

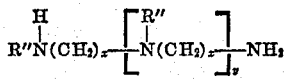

wherein R″ is a substituent selected from the group consisting of hydrogen, an alkyl radical and an aryl radical, "x" is an integer of at least 2, and "y" is an integer having a value from 0–8, aromatic diamines and ammonia, in a mole ratio of (I) to (II) of 0.6:1 to 3:1, respectively, at atmospheric pressure and at a temperature of from about 20° C. to about 90° C. to a point short of the gel stage and terminating further polymerization by the addition of sufficient amount of a mono secondary amine to react with the residual vinyl groups of said copolymer.

4. A process of preparing a high molecular weight water-soluble copolymer comprising reacting N,N′-methylene-bis-acrylamide and ethylenediamine in a mole ratio of 0.8:1 to 3:1 respectively, at atmospheric pressure and at a temperature of from about 20° C. to about 90° C. to a point short of the gel stage and terminating cross-linking in the reacting mixture by the addition of a mono secondary amine equivalent in amount to about 2.5 to 3 times the difference between the amount of said methylene-bis-acrylamide and said ethylenediamine and 0.8.

5. A process of preparing a high molecular weight water-soluble copolymer comprising reacting N,N′-methylene-bis-acrylamide and triethylenetetramine in a mole ratio of 0.8:1 to 3:1 respectively, at atmospheric pressure and at a temperature of from about 20° C. to about 90° C. to a point short of the gel stage and terminating cross-linking in the reacting mixture by the addition of a mono secondary amine equivalent in amount to about 2.5 to 3 times the difference between the amount of said methylene-bis acrylamide and said triethylenetetramine and 0.8.

6. A process of preparing a high molecular weight water-soluble copolymer comprising reacting N,N′-methylene-bis-acrylamide and bisiminopropylamine in a mole ratio of 0.8:1 to 3:1 respectively, at atmospheric pressure and at a temperature of from about 20° C. to about 90° C. to a point short of the gel stage and terminating cross-linking in the reacting mixture by the addition of a mono secondary amine equivalent in amount to about 2.5 to 3 times the difference between the amount of said methylene-bis-acrylamide and said bisiminopropylamine and 0.8.

7. A process of preparing a high molecular weight water-soluble copolymer comprising reacting N,N′-methylene-bis-acrylamide and ammonia in a mole ratio of 0.8:1 to 3:1 respectively at atmospheric pressure and at a temperature of from about 20° C. to about 90° C. to a point short of the gel stage and terminating cross-linking in the reacting mixture by the addition of a mono secondary amine equivalent in amount to about 2.5 to 3 times the difference between the amount of said methylene-bis-acrylamide and said ammonia and 0.8.

8. A process of preparing a high molecular weight water-soluble copolymer comprising reacting hexahydro-1,3,5-triacrylyl-s-triazine and triethylenetetramine in a mole ratio of 0.6:1 to 2:1 respectively, at atmospheric pressure and at a temperature of from about 20° C. to about 90° C. to a point short of the gel stage and terminating cross-linking in the reacting mixture by the addition of a mono secondary amine equivalent in amount to about 2.5 to 3 times the difference between the amount of said hexahydro-1,3,5-triacrylyl-s-triazine and said triethylenetetramine and 0.8.

9. A composition of matter comprising a high molecular weight water-soluble addition reaction product, free of vinyl groupings, obtained by reacting a compound (I) selected from the group (a) having the formula

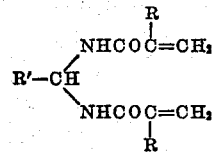

and (b) having the formula

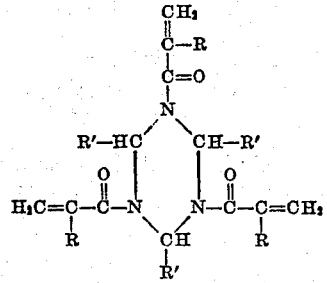

wherein R′—CH< is the hydrocarbon residue of an aldehyde and R is a member of the group consisting of hydrogen and alkyl radicals having 1 to 4 carbon atoms, and a compound (II) selected from the group of low molecular weight alkylene polyamine of the general formula

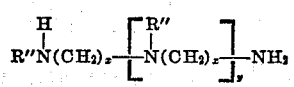

wherein R″ is a substituent selected from the group consisting of hydrogen, an alkyl radical and an aryl radical, "x" is an integer of at least 2, and "y" is an integer having a value from 0–8, aromatic diamines and ammonia, in a mole ratio of (I) to (II) of 0.4:1 to 3:1, respectively, at atmospheric pressure and at a temperature of from about 20° C. to about 90° C. to a point short of the gel stage and admixing therewith a mono secondary amine.

10. A composition of matter comprising a high molecular weight water-soluble polymerization reaction product obtained by reacting a compound (I) selected from the group (a) having the formula

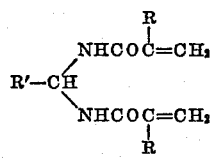

and (b) having the formula

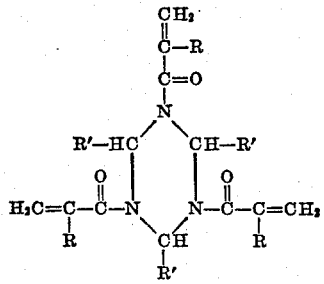

wherein R′—CH< is the hydrocarbon residue of an aldehyde and R is a member of the group consisting of hydrogen and alkyl radicals having 1 to 4 carbon atoms, and a compound (II) selected from the group of low molecular weight alkylene polyamine of the general formula

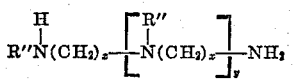

wherein R″ is a substituent selected from the group consisting of hydrogen, an alkyl radical and an aryl radical, "x" is an integer of at least 2, and "y" is an integer having a value from 0–8 and ammonia in a mole ratio of (I) to (II) of 0.6:1 to 3:1, respectively, at atmospheric pressure and at a temperature of from about 20° C. to about 90° C. to a point short of the gel stage and admixing therewith a mono secondary amine.

11. A composition of matter comprising a high molecular weight water-soluble copolymerization reaction product obtained by reacting (I) N,N'-methylene-bis-acrylamide and a compound (II) selected from the group of low molecular weight alkylene polyamine of the general formula

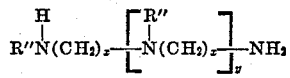

wherein R" is a substituent selected from the group consisting of hydrogen, an alkyl radical and an aryl radical, "x" is an integer of at least 2, and "y" is an integer having a value from 0–8, an aromatic diamine and ammonia in a mole ratio of (I) to (II) of 0.8:1 to 3:1 respectively, at atmospheric pressure and at a temperature of from about 20° C. to about 90° C. to a point short of the gel stage and admixing therewith a mono secondary amine.

12. A composition of matter comprising a high molecular weight water-soluble reaction product obtained by reacting N,N'-methylene-bis-acrylamide and ethylenediamine in a mole ratio of 0.8:1 to 3:1 respectively, at atmospheric pressure and a temperature of from about 20° C. to about 90° C. to a point short of the gel stage and admixing therewith a mono secondary amine.

13. A composition of matter comprising a high molecular weight water-soluble reaction product obtained by reacting N,N'-methylene-bis-acrylamide and triethylenetetramine in a mole ratio of 0.8:1 to 3:1 respectively, at atmospheric pressure and at a temperature of from about 20° C. to about 90° C. to a point short of the gel stage and admixing therewith a mono secondary amine.

14. A composition of matter comprising a high molecular weight water-soluble reaction product obtained by reacting N,N'-methylene-bis-acrylamide and bisiminopropylamine in a mole ratio of 0.8:1 to 3:1 respectively, at atmospheric pressure and at a temperature of from about 20° C. to about 90° C. to a point short of the gel stage and admixing therewith a mono secondary amine.

15. A composition of matter comprising a high molecular weight water-soluble reaction product obtained by reacting N,N'-methylene-bis-acrylamide and ammonia in a mole ratio of 0.8:1 to 3:1 respectively, at atmospheric pressure and at a temperature of from about 20° C. to about 90° C. to a point short of the gel stage and admixing therewith a mono secondary amine.

16. A composition of matter comprising a high molecular weight water-soluble reaction product obtained by reacting hexahydro-1,3,5-acrylyl-s-triazine and triethylenetetramine in a mole ratio of 0.6:1 to 3:1 respectively, at atmospheric pressure and at a temperature of from about 20° C. to about 90° C. to a point short of the gel stage and admixing therewith a mono secondary amine.

References Cited in the file of this patent
UNITED STATES PATENTS

| | | |
|---|---|---|
| 2,576,501 | Dalton | Nov. 27, 1951 |
| 2,643,958 | Kleiner et al. | June 30, 1953 |